Figure 1:
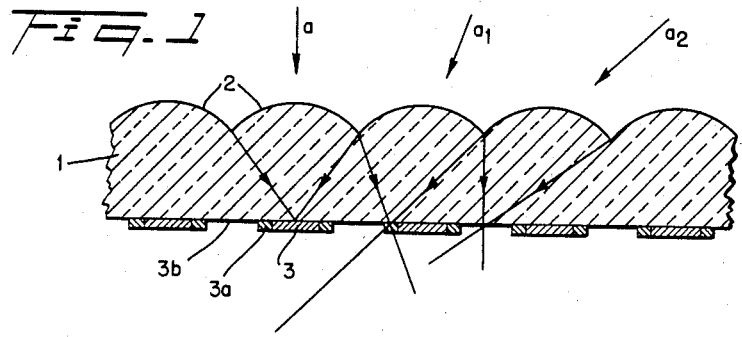

INVENTORS
MAURICE BOURGEAUX
FRANCIS NAUDIN
BY Bauer and Seymour
ATTORNEYS

April 16, 1963  M. BOURGEAUX ET AL  3,085,473
SHEETS, BRICKS, BLOCKS OR SIMILAR ARTICLES MADE OF
TRANSPARENT MATERIAL, ESPECIALLY GLASS
Filed July 8, 1958  2 Sheets-Sheet 2

INVENTORS
MAURICE BOURGEAUX
FRANCIS NAUDIN
BY *Bauer and Seymour*
ATTORNEYS 3,085,473
SHEETS, BRICKS, BLOCKS OR SIMILAR ARTICLES MADE OF TRANSPARENT MATERIAL, ESPECIALLY GLASS
Maurice Bourgeaux and Francis Naudin, Paris, France, assignors to Compagnie de Saint-Gobain, Paris, France
Filed July 8, 1958, Ser. No. 747,136
Claims priority, application France July 10, 1957
6 Claims. (Cl. 88—57.5)

The present invention relates to sheets, bricks, blocks or similar articles made of transparent material, especially glass, having a transparency or a coloration varying as a function of the angle of incidence of the striking light beams.

According to the invention one face of the articles presents ribs or wavings co-acting with strips of various transparencies or colorations so that the light beams are directed by the ribs or wavings onto different strips in accordance with the angle of incidence of the striking beams on said face.

The invention has also for its object the application of the said sheets, bricks or blocks to glazings, the ribs or wavings and the strips of different transparencies being so disposed with respect to the others as to obtain a darkening, for example, when the sun is at its zenith, and a normal lighting is obtained when the sun is down to the sky line. With such construction the transmitted light increases or decreases when the sun draws near to or moves off from the zenith.

In one form of the article according to the invention, the front face of a transparent sheet or the front face of one wall of the block is provided with wavings, especially in the form of cylindrical lenses directing or concentrating the light beams onto strips provided on the other face of the sheet or wall and disposed symmetrically with respect to the plane of optical symmetry of said lenses.

According to another form the wavings, especially in the form of cylindrical lens, concentrate the light beams onto strips placed asymmetrically with respect to the plane of optical symmetry of said lens, The strips may be constituted by metal, in particular by aluminium sheets or finely divided aluminium projected on the glass by means of a spray gun, by paints or by enamels, etc.

Especially when said sheets or blocks are utilized as glazings it is possible to contemplate the following dispositions to enable the reducing of lighting ratio or contrast between the shadow and the lighted zones:

(a) Instead of opaque strips it is possible to utilize semi-transparent or diffusing zones obtained, for example, by superficial attack of the glass surfaces (by sand blasting for example),
(b) The edges of the strips may be cut or notched or said strips are made in the form of squares disposed in check-patterns,
(c) A material diffusing the light, for example, a veil of glass fibres, ribbed glass, etc. can be placed between the glazing and the observer,
(d) Several strips reflecting the light can be employed in order to collect on the observer's side the direct radiation together with several reflected radiations.

To obtain lighting effects of variable coloration, the strips may be given different colorations so that, according to the inclination of the incident light beams, these beams cross through strips of different colors.

Said strips may have colorations and patterns enabling the obtaining of, in case of utilization as glazings, the following effects:

From the rising of the sun to the end of forenoon: colorations corresponding to the upper part of the colors spectrum that is: yellow, orange, red, purple,
From the end of forenoon to the beginning of afternoon: a darkening,
From the beginning of afternoon to evening, colorations corresponding to the lower part of the colors spectrum: purple, blue, green.

Other characteristics and advantages of the invention will appear from the following description relating to the preferred, non-limiting embodiments shown in the drawings for the purpose of illustrating the invention.

Figure 2:
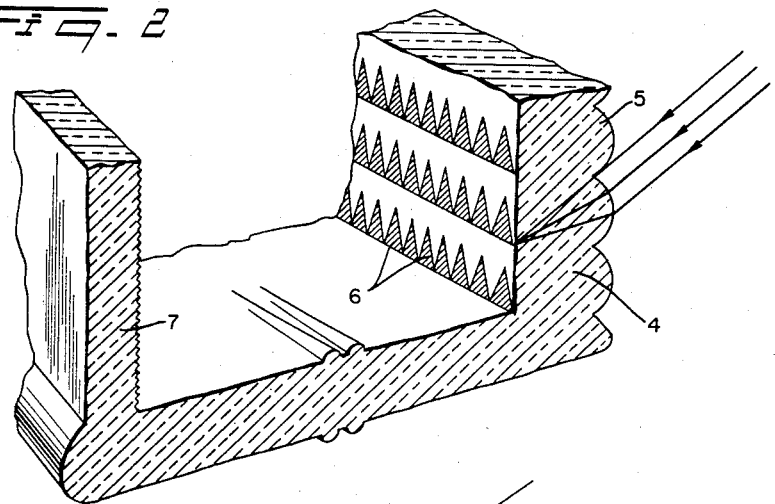
Figure 3:
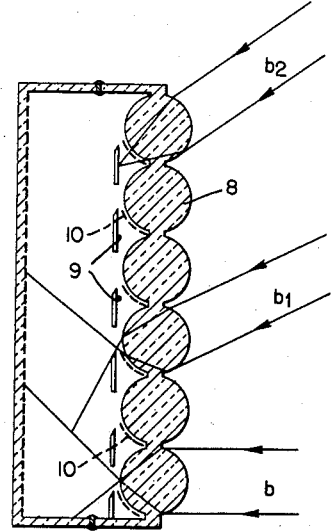
Figure 4:
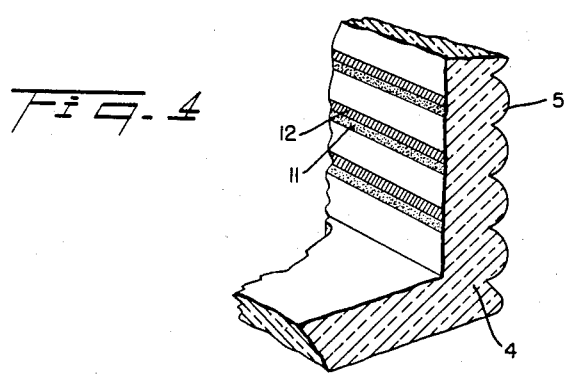
Figure 5:
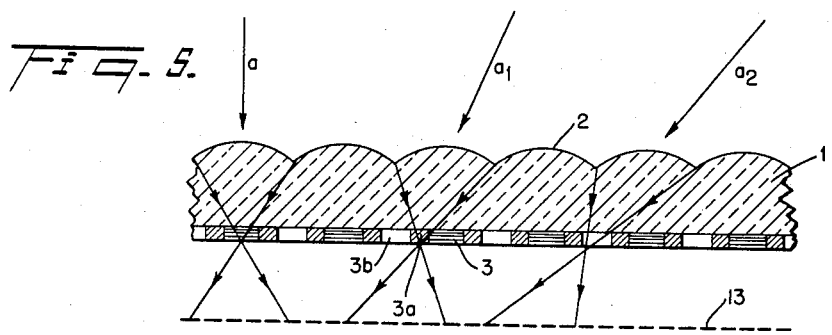

In said drawings:
FIG. 1 is a cross section of a glass sheet according to the invention.
FIG. 2 is a partial perspective view of a block in accordance with the invention.
FIG. 3 is a cross section of an alternative embodiment.
FIG. 4 is a partial perspective view of another form of the invention relating to a glass block.
FIG. 5 is a cross section of a glass sheet according to the invention producing variable coloration effects.

In FIG. 1, the front face of the glass sheet 1 is formed by joined cylindrical lenses 2 and the back face comprises parallel strips of variable transparencies 3, 3a, 3b, the strips 3 being the most opaque and the strips 3b the most transparent; said last strips may be constituted by the glass of the back face itself. The strips are placed symmetrically in respect to the optical axis of the lenses 2.

It is obvious that if the light beams strike the front face of the sheet along directions parallel to direction $a$, the lenses 2 concentrate the beams towards strips 3 producing a darkening. If they strike the front face according to direction $a_1$, they are concentrated by the lenses onto strips $3a$ of medium transparency and if they strike said face according to direction $a_2$ they are concentrated onto transparent strips $3b$, and they therefore pass through the sheet.

FIG. 2 represents a cross-sectional view of the front face of wall 4 of a hollow glass block provided with cylindrical lenses 5 placed edge to edge. The back face of said wall is provided with strips 6 parallel to lens generatrix, each of said strips co-operating with one each lens. The internal face 7 of the back wall is preferably frosted or ground or slightly ribbed.

Strips 6 have, in the present example, an indented form and may be constituted by a plurality of triangles with joined bases.

If said block is utilized as glazing and placed so that the lens be horizontal, its effect on the light beams is as follows:

If the sun is high on the sky line the light beams are concentrated by the lenses towards the strips. They are also stopped entirely or in part by said strips according to the height of the sun. If the strips are metallized, the higher the position of the sun, the more the light beams are reflected towards the exterior. An anti-calorific effect is obtained in addition to the darkening.

The diffusing back face integrates the light transmitted through the strips, that is, presents an area of more or less uniformity.

When the sun is low on the sky line, the light beams are concentrated by the lenses on lines which pass beyond the margins of the strips and the light travels normally.

In FIG. 3, the front face of the wall of the hollow glass block is constituted by cylindrical lenses 8 and a screen formed by strips 9 parallel to the generatrix of each of the lenses is provided inside said block. Said strips may be notched similarly to strips 6 of FIG. 2.

The cylindrical lenses 8 focus the sun light on the screen, the block being placed so that the lenses are horizontal; the action of the block on the light beams is the same as those of the block of FIG. 2. In FIG. 3 the paths of travel of the light beams are represented as a function of their angle of incidence $b$, $b_1$, $b_2$ with the anterior face of the block.

In place of screen 9 it is possible to employ strips or coatings, as represented in FIG. 3 by dotted lines 10 about the lower part of internal surface of the lens.

FIG. 4 represents an alternative construction in which the block is provided with colored strips 11 and 12 in place of notched strips. The strips 11 disposed facing the lower part of lenses are, for example, blue, and the strips 12 placed above, are alternatively yellow and orange, for example. When the sun is high, the light transmitted is colored in blue. The light progressively becomes green and then yellow, when the sun goes down.

The arrangement of FIG. 5 also allows the obtaining of variable colorations with a glass sheet comprising, as the sheet of FIG. 1, cylindrical joined lenses 2 on its front face. In this case, the strips are colored, for example, the central strips 3 in blue, the intermediate strips $3a$ in red, and the end strips $3b$ in yellow.

If said sheet is utilized as glazing and southerly oriented with its lenses vertically disposed, said lenses will concentrate the light on the yellow strips at sunrise and sundown so that the light appears yellow. At noon the blue strips will be lighted and the transmitted light appears blue. During forenoon and afternoon, the light will appear orange, then red, and afterwards purple.

The arrangement will be advantageously completed by a diffusing screen 13 placed at a short distance from the glazing back face. The screen prevents focusing of the eye on the brilliant focal lines, and thus prevents eye strains.

Said diffusing screen may be replaced by a glazing with cylindrical lenses similar to the first one and placed so that the strips are at the lens focus. This produced an afocal system from which the sun rays go out colored and parallel.

For a southerly exposed glazing with vertical cylindrical lenses, the slope of the rays in an horizontal plane varies throughout a range of about 180°; it is the height of the sun which determines the coloration if the lenses are horizontal; the colored strips must then be disposed conveniently to receive the light beams. The strips are narrower as the latitude is higher.

In the present embodiment of the invention, the lenses constitute the front face of the glazing and the colored strips the back face. tI is also possible to dispose the strips on the front face, and to have the cylindrical lens turned towards the observer. The color which the observer sees in the glazing depends both upon his place in respect to the glazing and upon the angle of incidence of the sun rays. The glazing appears to him uniformly colored without need of a diffusing glass.

The arrangement of FIG. 3 may equally be utilized to obtain variable colorations in substituting to screen 9 strips or coatings 10 with adequate colorations. For example, the strip facing the lower part of the lens may be blue, then alternately green and orange.

As many apparently widely different embodiments of the present invention may be made without departing from the spirit and scope thereof, it is to be understood that the invention is not limited to the specific embodiments.

What is claimed is:

1. A glazing for use in a building for the transmission of light from a moving source of illumination having surfaces lying side by side of which one is to receive incident light and transmit it to the other, said one surface comprising parallel rows of lenticulations which receive incident light, divide it into bands, and focus the bands of light upon the other of said surfaces, said other surface being divided into light controlling and modifying strips extending approximately parallel to the rows of lenticulations and in fixed relation thereto, said strips including alternate subdivisions of different degrees of transparency, whereby light transmitted by the lenticulations is transmitted through the glazing with modifications imposed by the controlling strips in accordance with the angle of the incident light.

2. A glazing according to claim 1 in which said series of the controlling strips have indented form, said indentations being angular and of different transparency from the remaining parts of said indented strips.

3. A glazing according to claim 1 in which the lenticulations are in effect cylindrical, the semi-cylindrical surfaces which receive the incident light focussing it in bands on the opposite semi-cylindrical surfaces, and the light controlling strips being applied to the said opposite surfaces.

4. A glazing according to claim 3 in which a grating is mounted adjacent the said opposite semi-cylindrical surfaces.

5. A glazing according to claim 1 in which each of the light controlling strips includes a transparent, and at least two different colored subdivisions which are aligned with the focussed bands of light.

6. A glazing according to claim 1 in which each of the light controlling strips includes a series of subdivisions of which the first imparts one color to the band of light focussed thereon, the second imparts a second color thereto, and the third imparts a third color.

References Cited in the file of this patent

UNITED STATES PATENTS

| | | |
|---|---|---|
| 540,768 | Western | June 11, 1895 |
| 1,128,979 | Hess | Feb. 16, 1915 |
| 1,475,430 | Curwen | Nov. 27, 1923 |
| 2,011,252 | Modigliani | Aug. 13, 1935 |
| 2,060,669 | Gretener | Nov. 10, 1936 |
| 2,107,994 | Hazelton | Feb. 8, 1938 |
| 2,186,613 | Mihalyi | Jan. 9, 1940 |
| 2,272,061 | Drake | Feb. 3, 1942 |
| 2,297,337 | Wiley | Sept. 29, 1942 |
| 2,618,198 | Luboshez | Nov. 18, 1952 |
| 2,714,816 | Pennell | Aug. 9, 1955 |
| 2,832,593 | Anderson | Apr. 29, 1958 |
| 2,888,007 | Tabor | May 26, 1959 |
| 2,993,409 | Boyd | July 25, 1961 |